United States Patent
Whelihan et al.

(10) Patent No.: US 10,255,070 B2
(45) Date of Patent: Apr. 9, 2019

(54) ISA EXTENSIONS FOR SYNCHRONOUS COALESCED ACCESSES

(71) Applicant: Massachusetts Institute of Technology, Cambridge, MA (US)

(72) Inventors: David Joseph Whelihan, Framingham, MA (US); Paul Stanton Keltcher, Lexington, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 1094 days.

(21) Appl. No.: 14/476,848

(22) Filed: Sep. 4, 2014

(65) Prior Publication Data

US 2017/0300330 A1      Oct. 19, 2017

Related U.S. Application Data

(60) Provisional application No. 61/875,075, filed on Sep. 8, 2013, provisional application No. 61/874,769, filed on Sep. 6, 2013.

(51) Int. Cl.
*G06F 9/30* (2018.01)
*G06F 9/52* (2006.01)
(Continued)

(52) U.S. Cl.
CPC ........ *G06F 9/30087* (2013.01); *G06F 9/3009* (2013.01); *G06F 9/52* (2013.01);
(Continued)

(58) Field of Classification Search
CPC .. G06F 9/30087; G06F 9/3009; G06F 9/3885; G06F 12/1425; G06F 15/17325;
(Continued)

(56) References Cited

U.S. PATENT DOCUMENTS 6,505,269 B1   1/2003  Potter
6,898,013 B2   5/2005  Hall
(Continued)

FOREIGN PATENT DOCUMENTS

EP  2 189 903 A2   5/2010
WO  WO 2012/015430 A1   2/2012
WO  WO 2015/034802 A1   3/2015

OTHER PUBLICATIONS

Hendry et al., "Silicon Nanophotonic Network-On-Chip Using TDM Arbitration", 2010, IEEE. (Year: 2010).*
(Continued)

*Primary Examiner* — Benjamin P Geib
(74) *Attorney, Agent, or Firm* — Hamilton, Brook, Smith & Reynolds, P.C.

(57) ABSTRACT

Global synchrony changes the way computers can be programmed. A new class of ISA level instructions (the globally-synchronous load-store) of the present invention is presented. In the context of multiple load-store machines, the globally synchronous load-store architecture allows the programmer to think about a collection of independent load-store machines as a single load-store machine. These ISA instructions may be applied to a distributed matrix transpose or other data that exhibit a high degree of data non-locality and difficulty in efficiently parallelizing on modern computer system architectures. Included in the new ISA instructions are a setup instruction and a synchronous coalescing access instruction ("sca"). The setup instruction configures a head processor to set up a global map that corresponds processor data contiguously to the memory. The "sca" instruction configures processors to block processor threads until respective times on a global clock, derived from the global map, to access the memory.

24 Claims, 12 Drawing Sheets

(51) Int. Cl.
   *G06F 12/14* (2006.01)
   *G06F 15/80* (2006.01)
(52) U.S. Cl.
   CPC .......... *G06F 12/1425* (2013.01); *G06F 15/80* (2013.01); *G06F 2212/1052* (2013.01)
(58) Field of Classification Search
   CPC ........ G06F 15/80; G06F 9/52; G06F 15/8007; G06F 15/8015; G06F 15/8023; G06F 15/803
   See application file for complete search history.

(56) References Cited

U.S. PATENT DOCUMENTS

| | | | |
|---|---|---|---|
| 7,100,021 B1 * | 8/2006 | Marshall | G06F 9/52 712/19 |
| 7,466,884 B2 | 12/2008 | Beausoleil | |
| 7,532,785 B1 | 5/2009 | Beausoleil et al. | |
| 7,786,427 B2 | 3/2010 | Forrest et al. | |
| 7,894,699 B2 | 2/2011 | Beausoleil | |
| 8,064,739 B2 | 11/2011 | Binkert et al. | |
| 8,335,434 B2 | 12/2012 | Beausoleil et al. | |
| 8,473,659 B2 | 6/2013 | Koka et al. | |
| 8,792,786 B2 | 7/2014 | Whelihan et al. | |
| 2008/0112703 A1 | 5/2008 | Beausoleil et al. | |
| 2011/0010525 A1 | 1/2011 | Binkert et al. | |
| 2011/0052199 A1 | 3/2011 | Beshai | |
| 2011/0103799 A1 | 5/2011 | Shacham et al. | |
| 2013/0243429 A1 | 9/2013 | Whelihan et al. | |

OTHER PUBLICATIONS

Vantrease et al., "Corona: System Implications of Emerging Nanophotonic Technology", 2008, IEEE. (Year: 2008).*

David Mizell, Cray, Inc., "Introduction to the Cray XMT," retrieved from the Internet URL: http://wwwjp.cray.com/downloads/XMT-Presentation.pdf, pp. 1-47, Sep. 2010.

In David Whelihan et al., "P-Sync: A Photonically Enabled Architecture for Efficient Non-local Data Access," in *IEEE International Parallel and Distributed Processing Symposium (IPDPS)*, pp. 189-200, May 2013.

Nvidia's Next Generation CUDA Compute Architecture: Kepler GK110, The Fastest, Most Efficient HPC Architecture Ever Built, retrieved from the Internet URL: http://www.nvidia.com/content/PDF/kepler/NVIDIA-Kepler-GK110-Architecture-Whitepaper.pdf, pp. 1-24, May 2012.

Greg Ruetsch, Paulius Micikevicius, "Optimizing Matrix Transpose in CUDA," NVIDIA, pp. 1-24, Jan. 2009.

John Feo, David Harper, Simon Kahan, Petr Konecny, "Eldorado," in *Proceedings of the 2nd conference on Computing Frontiers*, ACM, May 2005.

George Chin, Andres Marquez, Sutanay Choudhury, Kristyn Maschhoff, "Implementing and Evaluating Multithreaded Triad Census Algorithms on the Cray XMT," in *IEEE International Symposium on Parallel and Distributed Processing*, May 2009.

Pranay Koka, Michael McCracken, Herb Schwetman, Xuezhe Zheng, Ron Ho, Ashok Krishnamoorthy, "Silicon-photonic Network Architectures for Scalable, Power-efficient Multi-chip Systems," in *Proceedings of the 37th Annual International Symposium on Computer Architecture*, Jun. 2010.

N. Bliss, K. Asanovic, K. Bergman, L. Carloni, J. Kepner, and V. Stojanovic, "Photonic Many-Core Architecture Study," in *Proceedings of the Twelfth Annual Workshop on High Performance Embedded Computing (HPEC)*, Sep. 2008.

Shekhar Borkar, Pradeep Dubey, Kevin Kahn, David Kuck, Hans Mulder, Stephen Pawlowski, Justin Rattner, "Platform 2015: *Intel Processor and Platform Evolution for the Next Decade*," retrieved from the Internet URL: http://epic.hpi.uni-potsdam.de/pub/Home/TrendsAndConceptsII2010/HW_Trends_borkar_2015.pdf, pp. 1-12, Sep. 2010.

Intel Hyper-Threading Technology, retrieved from the Internet URL: http://www.intel.com/content/www/us/en/architecture-and-technology/hyper-threading/hyper-threading-technology.html, Sep. 2011.

Paul Keltcher, David Whelihan and Jeffrey Hughes, "Instruction Set Extensions for Photonic Synchronous Coalesced Accesses," *High Performance Extreme Computing Conference (HPEC)*, Sep. 2013.

Luo, F., et al., "Photonic Switching Network for Parallel Multiprocessor Cluster System Using VCSEL Laser Arrays," *Proc. SPIE Int. Opt. Eng.*, 4913: 214-220, Sep. 2002.

Notification of Transmittal of the International Preliminary Report on Patentability for Int'l Application No. PCT/US2014/053648, "ISA Extensions for Synchronous Coalesced Accesses," dated Mar. 17, 2016.

Paul Keltcher, David Whelihan and Jeffrey Hughes, Presentation for "Instruction Set Extensions for Photonic Synchronous Coalesced Accesses," Presentation from the *IEEE High Performance Extreme Computing Conference (HPEC)*, Sep. 2013; Retrieved from the Internet: URL:http://ieee-hpec.org/2013/index_htm_files/KetchnerHPEC_2013_Presentation.pdf; Retrieved on Nov. 27, 2014.

Notification of Transmittal of the International Search Report and the Written Opinion of the International Searching Authority for PCT/US2014/053648, "ISA Extensions for Synchronous Coalesced Accesses," dated Dec. 5, 2014.

* cited by examiner

FULL TRANSPOSE CODE

HEAD NODE ~301

R1 = global_base_address
R2 = 0          // current row
R3 = num_rows   // loop count .loop:
    // R4 = global address of row
    // to coalesce
    R4 = R1 + (R2 * row_size)
    ┌─────────────────────────────┐
    │ coalesce_sca R4, row_size   │──301a
    └─────────────────────────────┘
    add.32 R2, R2, 1   // current row
    sub.32 R3, R3, 1   // loop count // continue until all rows have
    // been coalesced.
    bra loop

WORKER NODE ~302

R1 = local_base_address
R2 = 0          // row index
R3 = row_size   // loop count .loop:
    // R5 = local data
    ld.local.u32 R5, local[R2]
    ┌─────────────────────────────┐
    │ sca.b32 R5, proc_id         │──302a
    └─────────────────────────────┘
    add.u32 r2, r2, 1   // pos in row
    sub.u32 r1, r1, 1   // loop count // continue until this row has
    // been coalesced.
    bra loop

FIG. 10

FULL TRANSPOSE CODE

HEAD NODE ~301

```
R1 = global_base_address
R2 = 0        // current row
R3 = num_rows // loop count
.loop:
// R4 = global address of row
// to coalesce
// R4 = R1 + (R2 * row_size)
  add.32 R2, R2, 1 // current row
  sub.32 R3, R3, 1 // loop count
```

`coalesce_sca R4, row_size` —301a

```
// continue until all rows have
// been coalesced.
bra loop
```

WORKER NODE ~302

- coalesce_sca EXECUTED ONCE FOR EACH ROW OF THE MATRIX.
- EACH TIME THROUGH THE LOOP, IT WILL WAIT FOR THE PRIOR COALESCE TO COMPLETE
303

```
// R5 = local data
ld.local.u32 R5, local[R2]
```

`sca.b32 R5, proc_id` —302a

```
add.u32 r2, r2, 1 // pos in row
sub.u32 r1, r1, 1 // loop count
// continue until this row has
// been coalesced.
bra loop
```

FIG. 11

ISA EXTENSIONS FOR SYNCHRONOUS COALESCED ACCESSES

RELATED APPLICATIONS

This application claims the benefit of U.S. Provisional Application No. 61/875,075, filed on Sep. 8, 2013, and U.S. Provisional Application No. 61/874,769, filed on Sep. 6, 2013. The entire teachings of the above applications are incorporated herein by reference.

GOVERNMENT SUPPORT

This invention was made with government support under Contract No. FA8721-05-C-0002 awarded by the U.S. Air Force. The government has certain rights in the invention.

BACKGROUND OF THE INVENTION

An Instruction Set Architecture (ISA) is the representation of an underlying computer architecture used by a programmer to realize application goals. The ISA exports the sum total of capabilities of a computer to the programmer and embodies the way it is intended to be used in a collection of instructions accessible to a programmer. A user (and/or machine) may use ISA instructions to make computer programs, through the use of a programming language, such as, but not limited to, Assembly language.

Despite the addition of performance-improving features such as super-scalar processing and caching, the programmer's mental model of a processor has changed little in 40 years. Therefore, the way computers are programmed has not changed significantly either. Unfortunately, the stalling of frequency scaling in the early twenty-first century, and the resultant shift from faster gates to more parallel gates has not resulted proportionally to increased performance, at least in part because the sequential programming style useful in Instruction-Level Parallelism (ILP) exploiting super scalar processors is at best ineffective in an explicitly parallel context, and at worst detrimental.

As parallel shared memory computers are becoming larger, incorporating tens of independent super-scalar cores, latency in interconnection networks is becoming the dominant factor limiting performance. Computer architects are attempting to mitigate the effects of latency by some existing approaches:

a) Adding instructions to prefetch data or have more explicit control over the behavior of the memory subsystem.
b) Increasing the number and proximity of caches to the execution core.
c) Increasing threading, thereby hiding the effects of latency.

The existing approaches are the result of an industry acceptance that electrical interconnect latency is an intractable problem. Existing approaches are deficient both in efficiency and in energy utilization. Yet another deficiency of existing approaches is that processing hardware is not synchronized over long distances. In existing approaches, the resulting lack of synchronization makes highly efficient parallel programming of many-core architectures difficult, and highly dependent upon architectural parameters.

SUMMARY OF THE INVENTION

The proposed approach includes a multi-processor system and corresponding method that remedies the deficiencies of the existing approaches, by providing an instruction set architecture (ISA) and a corresponding framework for global synchronization across processors. In the proposed approach, capability is provided to have global ISA instructions that work on all processor cores simultaneously.

In one embodiment, the addition of silicon photonics to the architect's technological toolbox is shown to enable scalable parallel efficiency in dense processing loads with very low data locality. However, in another embodiment, the proposed approach is not so limited, and the proposed approach may employ electrical connectivity (and/or electronic and/or electrical components), silicon photonics, and/or a hybrid between electrical connectivity and silicon photonics.

In one embodiment, a Synchronous Coalesced Access (SCA) may be employed to alleviate the effects of non-locality, by reorganizing data. The data may be reorganized in-flight in a photonic waveguide and/or using photonic synchronization (P-Sync), although the proposed approach is not so limited. See David Whelihan et al., "P-Sync: A Photonically Enabled Architecture for Efficient Non-local Data Access," in *IEEE International Parallel and Distributed Processing Symposium* (*IPDPS*), May 2013 (hereinafter "Whelihan," by Applicant and herein incorporated by reference in its entirety). The resulting capability provided by the proposed approach greatly increases parallel efficiency by removing uncertainty within inter-connect and the memory subsystem, enabling processors to operate in a lock-step, with high efficiency.

In the proposed approach, the foregoing high degree of global synchrony enables a new paradigm in parallel programming: the globally synchronous cooperative load and/or store. Applicant's contribution presents computer instructions that express global load-store behavior in a multi-core system (including massively multi-core systems) in which individual processors do not need to understand the entire global load and/or store data access pattern. The resulting capability of the proposed approach and the role of the proposed approach in program flow is described in the context of a Graphics Processing Unit (GPU)-style architecture.

The proposed approach is directed to a multi-processing computer system and a corresponding method for synchronization. An embodiment of a multi-processing computer system includes an array of processors coupled to a memory (including, but not limited to a global memory and/or a unified memory), and a head processor configured by a setup instruction in an ISA (Instruction Set Architecture) to set up a global map that corresponds (and/or organizes and/or coalesces and/or combines) data from certain ones of the processors contiguously to the memory. Certain ones of the processors in the array may be configured by a blocking synchronous coalescing access (SCA) ISA instruction to block processor threads until respective times, derived from the global map, to access the memory.

In another embodiment of the multi-processing computer system, at least one of the processors may perform at least one of: retrieving at least a portion of the data from the memory and sending at least a portion of the data to the memory. The retrieving and/or sending may include scatter and/or gather operations, in which data is collected together from multiple processors (gather) and/or data is distributed from the memory to multiple processors (scatter). In another embodiment, the setup instruction and the SCA ISA instruction may be user selectable and user settable. In yet another embodiment, at least one of the processors may access the memory in an interleaved fashion with respect to at least another of the processors. In another embodiment, the head processor may be one of the processors in the array. In one embodiment, the setup instruction may be executed at the head processor and the SCA ISA instruction may be provided by the head processor to the certain ones of the processors.

In another embodiment of the multi-processing computer system, portions of the memory may be located at geographically separate locations, and each given processor of the array may be associated with the memory and the portions of the memory. In another embodiment, the array of processors, head processor and memory are part of a photonically-enabled synchronous coalesced access network (PSCAN). The processors may access the memory through at least one photonic waveguide of the PSCAN. In yet another embodiment of the multi-processing computer system, the array of processors may use at least one of wavelength division multiplexing (WDM) and/or time division multiplexing (TDM) to access the memory.

In another embodiment of the multi-processing computer system, the array of processors, head processor and memory include at least one of: an electrically-enabled synchronous coalesced access network, wherein one or more of the processors access the memory through electrical connectivity; a PSCAN, wherein one or more of the processors access the memory through at least one photonic waveguide of the PSCAN; and a hybrid PSCAN (PSCAN), wherein one or more of the processors access the memory through a combination of at least one photonic waveguide and electrical connectivity.

An embodiment of a method of multi-processing may include, for an array of processors coupled to a memory, configuring a head processor to set up a global map that corresponds (and/or organizes and/or coalesces and/or combines) data from certain ones of the processors contiguously to the memory. The method may also include configuring the certain ones of the processors to block processor threads until respective times, derived from the global map, to access the memory.

An embodiment of a method of multi-processing may include at least one of the processors performing at least one of: retrieving at least a portion of the data from the memory and sending at least a portion of the data to the memory. In another embodiment, configuring of the head processor is by a setup instruction in an ISA (Instruction Set Architecture), and the configuring of the certain processors is by a blocking synchronous coalescing access (SCA) ISA instruction. In yet another embodiment, the setup instruction and the SCA ISA instruction are user selectable and user settable. In one embodiment, the setup instruction may be executed at the head processor and the SCA ISA instruction may be provided by the head processor to the certain ones of the processors.

In another embodiment of a method of multi-processing, at least one of the processors accesses the memory in an interleaved fashion with respect to at least another of the processors. In another embodiment, portions of the memory may be located at geographically separate locations, and each given processor of the array may be associated with the memory and the portions of the memory. The array of processors, head processor and memory may be part of a photonically-enabled synchronous coalesced access network (PSCAN); and the processors access the memory through a photonic waveguide of the PSCAN. The head processor may be one of the processors in the array.

In another embodiment of a method of multi-processing, the array of processors, head processor and memory may include at least one of: an electrically-enabled synchronous coalesced access network, wherein one or more of the processors access the memory through electrical connectivity; a PSCAN, wherein one or more of the processors access the memory through at least one photonic waveguide of the PSCAN; and a hybrid PSCAN (PSCAN), wherein one or more of the processors access the memory through a combination of at least one photonic waveguide and electrical connectivity.

An alternative embodiment is directed to a non-transitory computer readable medium having stored thereon a sequence of instructions which, when loaded and executed by a processor coupled to an apparatus causes the apparatus to: for an array of processors coupled to a memory, configure a head processor to set up a global map that corresponds (and/or organizes and/or coalesces and/or combines) data from certain ones of the processors contiguously to the memory; and configure the certain ones of the processors to block processor threads until respective times, derived from the global map, to access the memory.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 10 is a procedural code example of an embodiment of the present invention.

FIG. 11 illustrates the head node setup instruction of FIG. 10.

DETAILED DESCRIPTION OF THE INVENTION

Figure 1:
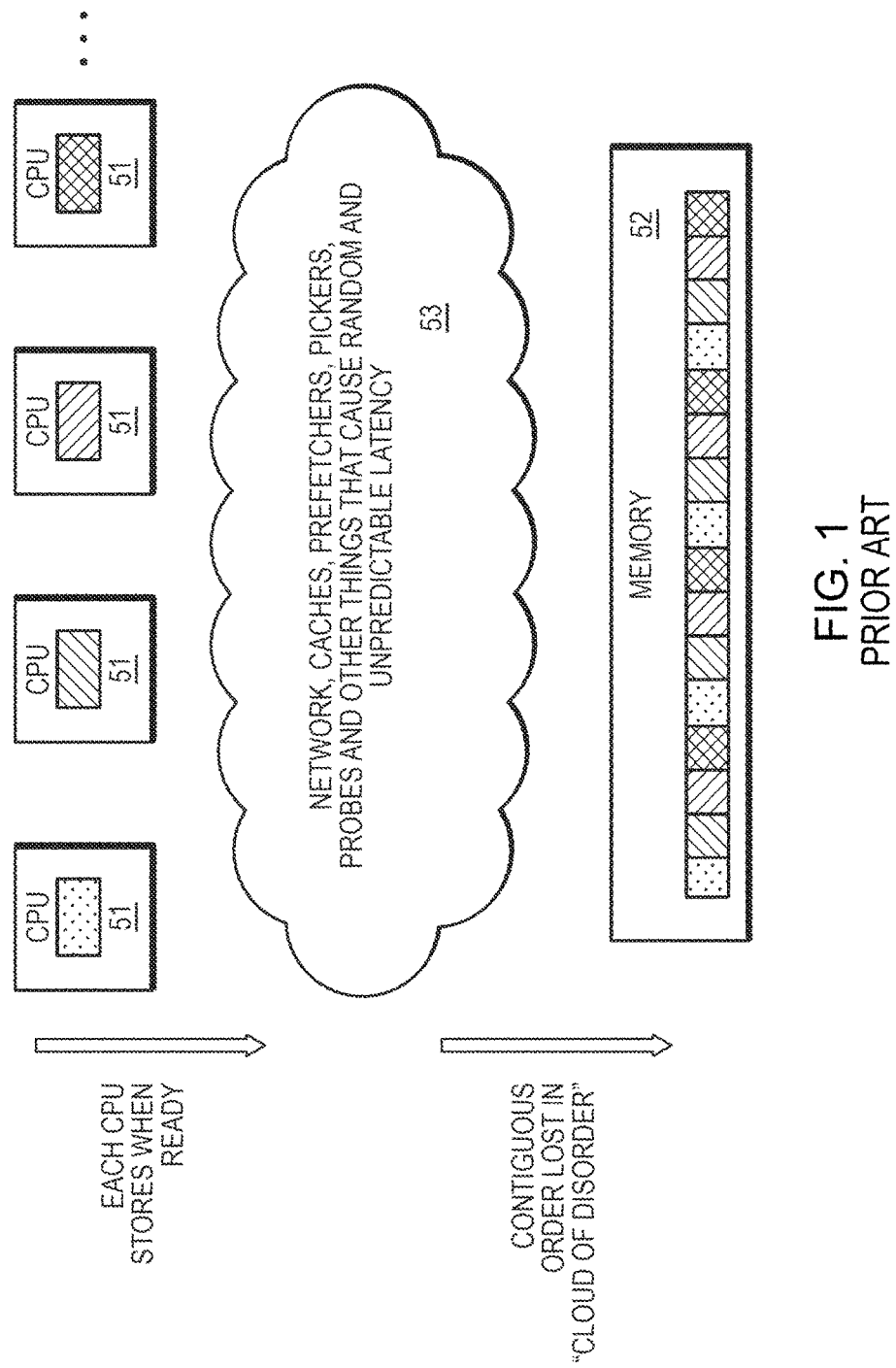
FIG. 1 is a block diagram illustrating deficiencies of existing prior art architectures.

A description of example embodiments of the invention follows.

The below description of the proposed approach is organized as follows. Related work, including how existing parallel architectures work with distributed data, is discussed in Section I. Section II provides an overview. Section III introduces the P-sync architecture of Whelihan and the SCA operation. Section IV describes how multi-dimensional matrices may be mapped to linear memory. In Section V, new ISA extensions of the proposed approach are proposed and respective effects of these ISA extensions on an example code stream for the challenging distributed matrix transpose operation are illustrated. Section VI provides a conclusion.

I. Related Work

One advantage of the proposed approach, compared with existing parallel architectures, is that the proposed approach may combine memory traffic of multiple independent processors into a single efficient memory transaction. To follow, existing approaches are discussed regarding how they interface multiple independent load-store streams.

General purpose CPUs, in trying to be general purpose, take architectural innovations from other more special purpose processors. To deal with high latency memories, modern general purpose machines manage latency by ISA additions such as prefetch, use caches and hardware prefetchers to reduce latency, amortize memory latency with vector instructions when possible and utilize limited hardware threading. While these innovations generally provide benefit to many single threaded applications, these constructs when applied to multi-core and/or multi-threaded applications with poor coordination between processors in a shared memory system may result in a performance penalty. By contrast, the SCA instructions of the proposed approach allow each processor to explicitly order its contribution to a single larger transaction. This type of optimization of the proposed approach is not possible with existing general purpose CPUs.

GPUs contain a large number of processing units which operate similar to SIMD units found in CPUs, are more special-purpose and excel when the application exhibits data parallelism. Prior to NVIDIA's KEPLER processor, data sharing between threads within a warp required a store and load operation. KEPLER added a Shuffle instruction that allows arbitrary permutations within a warp. Although this special instruction was added for communication between threads within a warp, GPUs have no synchronous, efficient global communication between warps. The programmer is required to explicitly move data between GPU devices via the CPU's memory, and like general purpose CPUs, multiple GPU processors cannot combine independent memory transactions from multiple processors into a single contiguous memory transaction. Still, if the data fits within the GPU (no off-chip interconnection requirements) and the application has sufficient parallelism (to amortize the on-chip interconnection limitations), performance may be quite high.

The CRAY XMT architecture does not fight the reality of high latencies within the interconnection network, but rather is architected to tolerate latency for parallel applications which exhibit a low degree of data locality. The XMT tolerates memory latency of large shared memory systems by using hundreds of threads per processor. While most threads are waiting for data, there should be at least one thread which can make forward progress. While this services the machine well for sparse data like graph traversal and sparse linear algebra, the XMT cannot optimize performance or efficiency for applications that have dense memory access patterns. Each thread in the XMT acts alone, so coordinating load-store instructions between threads into larger transactions for efficient memory usage is not possible in existing approaches, such as, but not limited to, existing approaches like the CRAY XMT.

The SUN/ORACLE MACROCHIP employs a point-to-point photonic interconnection between compute nodes on a single substrate. The goal of the macro-chip is to obtain performance like a traditional CMP, but with many more processors enabled by the high-bandwidth low-latency point-to-point interconnection between the cores on the virtual "chip." The compute nodes of the macro-chip are traditional general purpose processors, although any type of compute node could be imagined. To date there have been no proposed ISA additions in existing approaches, such as, but not limited to, existing approaches like the SUN/ORACLE MACROCHIP, in order to take advantage of photonics and/or electronics as in the proposed approach.

In addition, as illustrated in FIG. 1, existing architectures are built for locality and they do not perform well when there is no locality. As illustrated in FIG. 1, increasing parallelism may decrease memory arrival determination, resulting in a system that behaves chaotically 53. The challenge is not adding more CPUs 51, but system level coordination to shared resources, in particular the memory sub-system 52. A trend in the industry is to increase the number of processors, but no existing architecture provides support to synchronize multi-processor load and/or store operations. As illustrated in FIG. 1, each processor may hold one location of a contiguous global array. Computer elements that are targeted for locality (such as caches, pre-fetchers, etc.) may cause randomness 53 and the locality may be lost by the time the stored data reaches the memory 52.

II. Overview

An advantage of the proposed approach is that it allows a computer programmer to specify coordinated data accesses between spatially separate, but programmable processing elements by exporting two new Instruction Set Architecture (ISA) instructions. ISA instructions may be called by a programmer to exercise the features of a computer microarchitecture. One feature that the instructions of the proposed approach enable is the Synchronous Coalesced Access (SCA), described in U.S. application Ser. No. 13/477,943 (hereinafter '943) by Assignee and herein incorporated in its entirety by reference.

Computers with large numbers of processor cores (many hundreds), such as Graphics Processing Units (GPUs) are common in systems today. Such massively parallel Single Instruction Multiple Data (SIMD) machines are programmed using specialized Instruction-Set-Level languages like NVIDEA's PTX. Traditional parallel architectures such as those sold by INTEL are programmed using the X86 assembly language. Neither of these processor ISAs permit tight cooperation between processors, primarily due to limitations in signaling that preclude synchronization. The result is inefficiency as parallelism increases. The addition of a Photonic Synchronous Coalesced Access Network (PSCAN) permits a high degree of system-wide synchrony, enabling processors to coordinate to maximize efficiency of computation and utilization of the memory system.

In the proposed approach, instructions, such as ISA instructions, may include higher level features of computers, and may dictate the programming style rather than computing capability (or in addition to computing capability, in an alternative embodiment). The proposed approach includes at least two new instructions that export the SCA functionality, including the following:

setup_sca <base address> <bytes per block> <blocks per processor>—The first instruction, "setup_sca," may set up a global map of spatially separate data to unified memory.

sca<reg> <size>—The second instruction, "sca," may block a given processor thread until the given processor thread's time in the global map comes around (and/or arrives), at which time the given processor writes <size> bytes to the global memory, through the waveguide of a PSCAN and/or through electrical connectivity means.

One skilled in the art understands that other encodings and/or instructions may be used with the proposed approach. Additional methods may be used with the proposed approach, in order to express at least the same capability as in the proposed approach.

Key features of the proposed approach are a coordinating instruction ("setup_sca") and a data synchronizing instruction ("sca") as made clear below. Using these instructions, it is possible for a programmer to extract nearly 100% compute efficiency from a processor array capable of performing SCA operations. The instructions of the proposed approach and the underlying processor capability enable efficient computation and optimized memory (including, but not limited to, Dynamic Random Access Memory or DRAM, and/or Static Random Access Memory or SRAM, and/or other memory technologies known in the art) usage when data access patterns exhibit a high degree of non-locality, which is prohibitively difficult in both Graphics Processing Units (GPUs) and Central Processing Units (CPUs).

The proposed approach at least applies to parallel computer systems that require high efficiency derived from processor synchrony. The application of the proposed approach to systems results in a larger application space for a GPU-like "seas of processors," allowing processors to excel at non-local load and/or store access patterns, as seen in critical application kernels, including but not limited to a matrix transpose. A wide variety of companies in industry and government organizations may benefit from the programming model enabled by the ISA instructions of the proposed approach.

III. Sync

The proposed approach may use a Synchronous Coalesced Access Network (SCAN), including, but not limited to, a photonic network called a Photonic Synchronous Coalesced Access Network (PSCAN) described in Whelihan that may utilize chip-scale photonic networks for globally synchronous communication.

Instead of using chip-scale photonics as a means of increased bandwidth density, the proposed approach may use photonics (or other means, such as, but not limited to, electrical and/or electronic connectivity) for global synchrony over long distances, thereby enabling spatially separate processors to arbitrarily reorder data by synthesizing monolithic transactions in a given photonic waveguide. Using the proposed approach, memory read and/or write operations may be performed without any special buffering, resulting in an efficient (and/or optimal) use of channel and/or memory bandwidth. The proposed approach may provide, but is not limited to providing, near 100% efficient use of computation.

Figure 2:
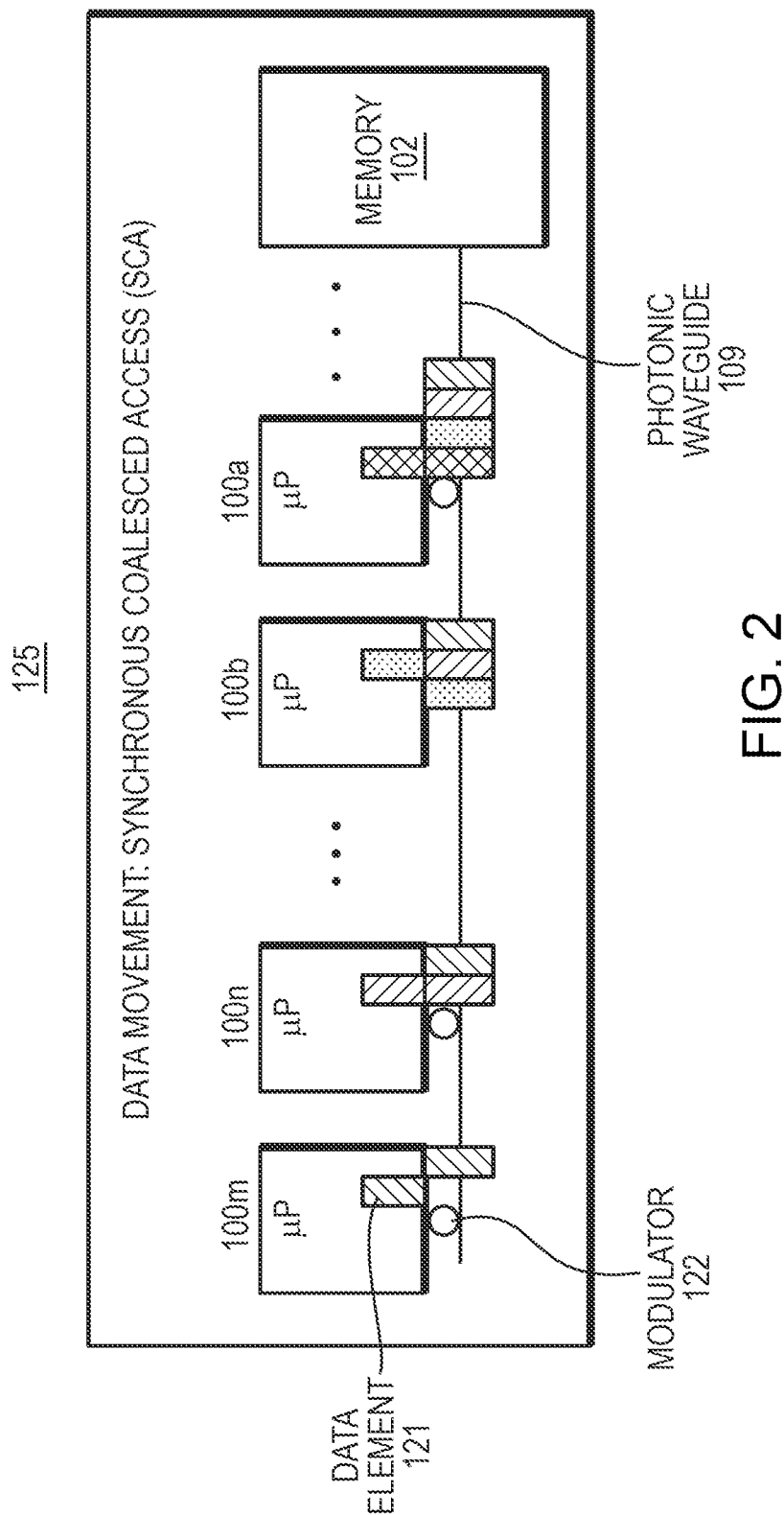
FIG. 2 is a block diagram of a multi-processor Synchronized Coalesced Access (SCA) architecture to which embodiments of the present invention apply.

As illustrated in FIG. 2, one embodiment 125 of the proposed approach may include a Synchronous Coalesced Access Network (SCAN). The proposed approach may use a photonic waveguide 109 to enable scalable, global, synchronous communication between one or more processors 100$m$, 100$n$, . . . 100$b$, 100$a$ and a memory 102. Using the proposed approach, multiple independent transactions may be synthesized on-the-fly and data elements 121 may be reorganized on the waveguide. The system and/or method 125 may include a photonic link, comprised of a laser acting as a source of light and a transmission medium such as a photonic waveguide 109 and a modulator 122 and/or detector within one or more of the worker processors 100$a$, 100$b$, . . . 100$n$, 100$m$, and/or the memory 102.

Figure 3:
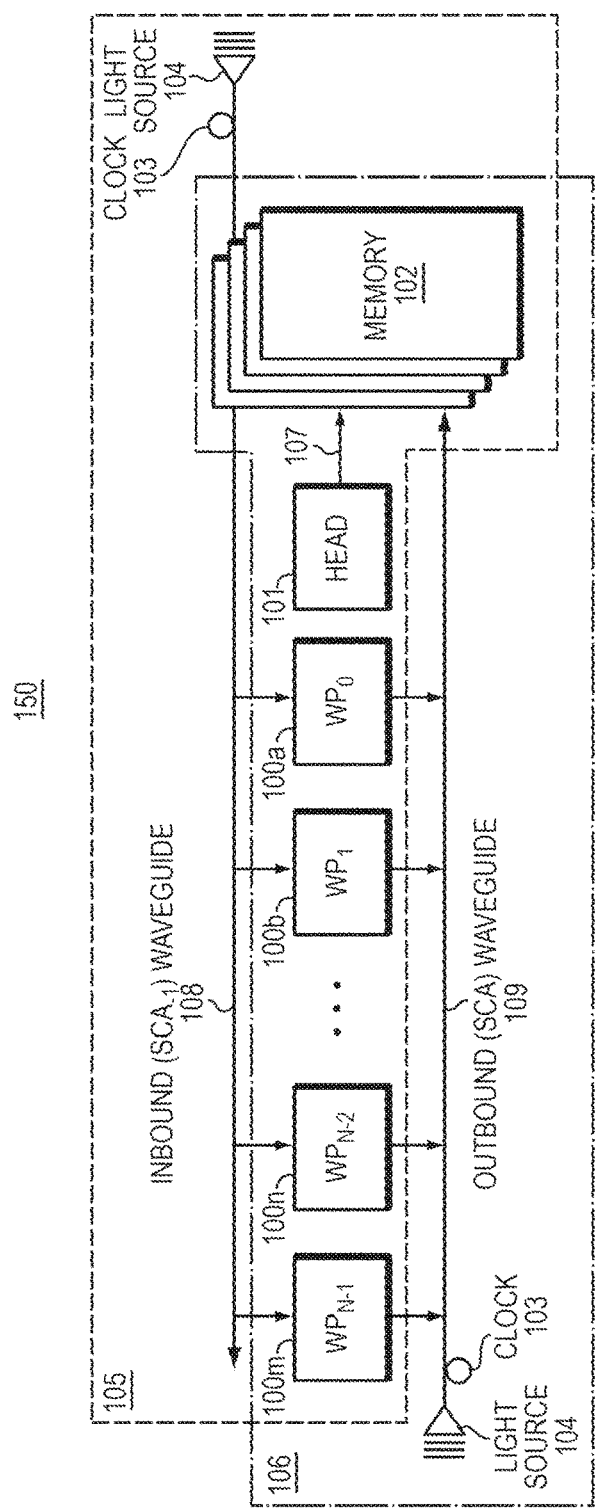
FIG. 3 is a block diagram of a multi-processor Photonic Sync (P-Sync) architecture to which embodiments of the present invention apply.

As illustrated in FIG. 3, the multi-processor system and/or method 150 of the proposed approach may include a P-Sync architecture and one or more PSCANs. The multi-processor system and/or method 150 may include one or more processors $WP_0$ to $WP_{N-1}$ (elements 100$a$, 100$b$, . . . 100$n$, 100$m$, respectively) which are "worker" processors. The "Head" node 101 coordinates traffic to and from a memory 102 (the memory may include, but is not limited to, a global memory and/or a shared memory, and the memory may be implemented in DRAM, SRAM or other memory technologies known in the art). The system and/or method 150 may include a photonic link, comprised of a laser acting as a source of light 104, and a transmission medium such as a photonic waveguide 108 and/or 109 and a modulator and/or detector within each of the worker processors and memory (each of the elements 100$a$, 100$b$, . . . 100$n$, 100$m$, and 102, respectively). A clock signal 103 may be transmitted down the one or more waveguides 108, 109 and detected at intervals by the processors and/or memory (each of the elements 100$a$, 100$b$, . . . 100$n$, 100$m$, and/or 102, respectively).

As illustrated in FIG. 3, a Photonic Synchronous Coalesced Access Network and/or first sub-network 105 may be used to access the shared memory for reads and another PSCAN and/or second sub-network 106 may be used to access the shared memory for writes. As illustrated in FIG. 3, the first sub-network 105 and second sub-network 106 may overlap with each other, and, as such, the worker processors (100$a$, 100$b$, . . . 100$n$, 100$m$) may share two PSCANs 105, 106. The first sub-network 105 may include, but is not limited to, an outbound Synchronous Coalesced Access (SCA) Waveguide 109 for write and/or read accesses (and/or transactions) to the memory from the worker processors (100$a$, 100$b$, . . . 100$n$, 100$m$), a head processor 101, a memory 102, a clock 103, and a light source 104. The second sub-network 106 may include, but is not limited to, an inbound Inverse Synchronous Coalesced Access ($SCA_{-1}$) Waveguide 108 for write and/or read accesses (and/or transactions) from the memory to the worker processors (100$a$, 100$b$, . . . 100$n$, 100$m$), a head processor 101, a memory 102, a clock 103, and a light source 104.

Like the GPU machine model, each worker processor (each of elements 100$a$, 100$b$, . . . 100$n$, 100$m$, respectively) may be relatively simple and have a large instruction issue width. A distinction between an existing GPU model and the proposed approach is that the proposed approach may coalesce (and/or combine and/or assemble) an arbitrary amount of data from worker processors (including, but not limited to, elements 100$a$, 100$b$, . . . 100$n$, 100$m$) to the global memory 102, whereas, in existing approaches GPU coalescing across processors is potentially inefficient, unscheduled, and applies to small blocks of memory. In the proposed approach, a head node 101 may coordinate memory traffic for the worker processors (100$a$, 100$b$, . . . 100$n$, 100$m$) by issuing read and/or write requests 107 to the memory 102. In the proposed approach, the global memory 102 may be visible to the processors (including, but not limited to, elements 100$a$, 100$b$, . . . 100$n$, 100$m$, and 101).

Figure 4:
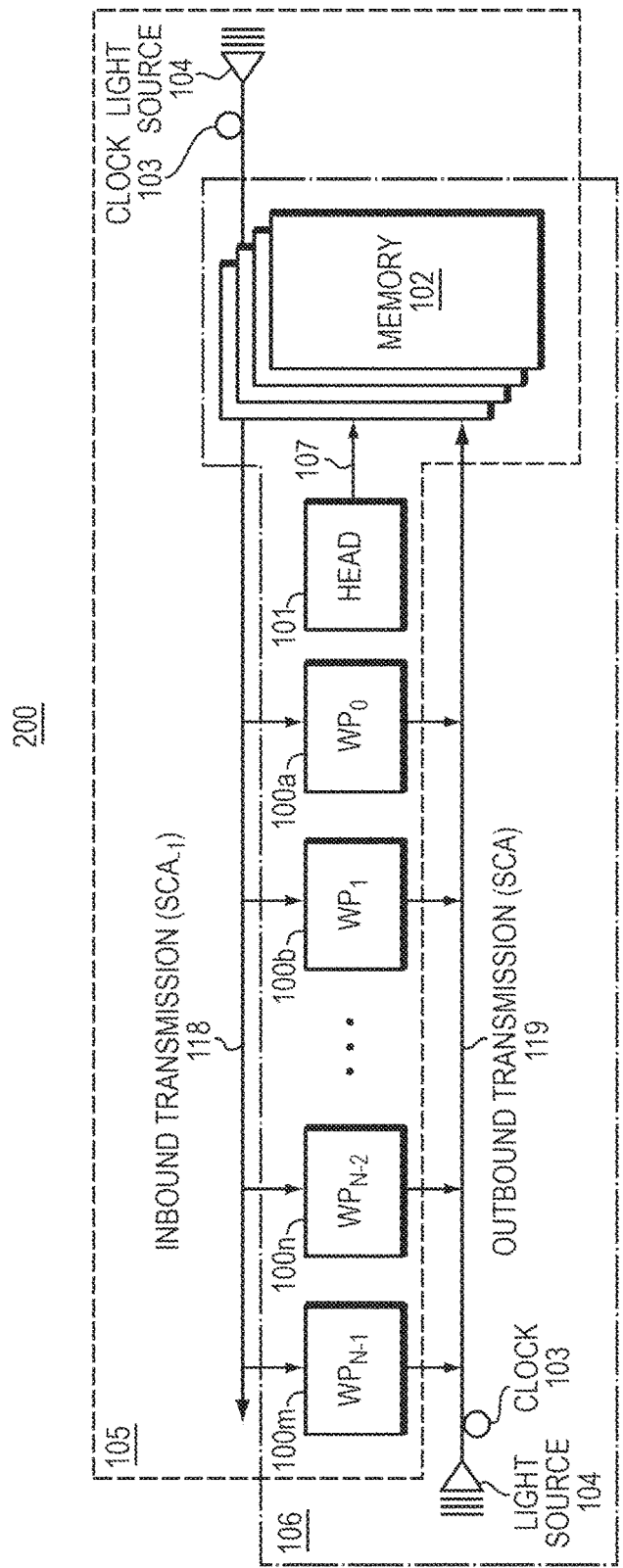
FIG. 4 is a block diagram of a multi-processor architecture to which embodiments of the present invention apply.

As illustrated in FIG. 4, another embodiment 200 of the proposed approach is not limited to only using photonic technology, and instead may support electrical technology, and/or a hybrid of electrical and/or photonic technology may be used as an alternative means of implementation. The embodiment 200 of FIG. 4 may utilize the same elements as the embodiment 150 in FIG. 3, except that the transmission media 118, 119 of FIG. 4 are not limited to photonics (as in FIG. 3, elements 108, 109) and also may include an electronic and/or electrical transmission media. Although illustrated in FIG. 4, the light source 104 is not required for an electronic implementation but may be optionally used for an electronic-photonic hybrid implementation.

Figure 5:
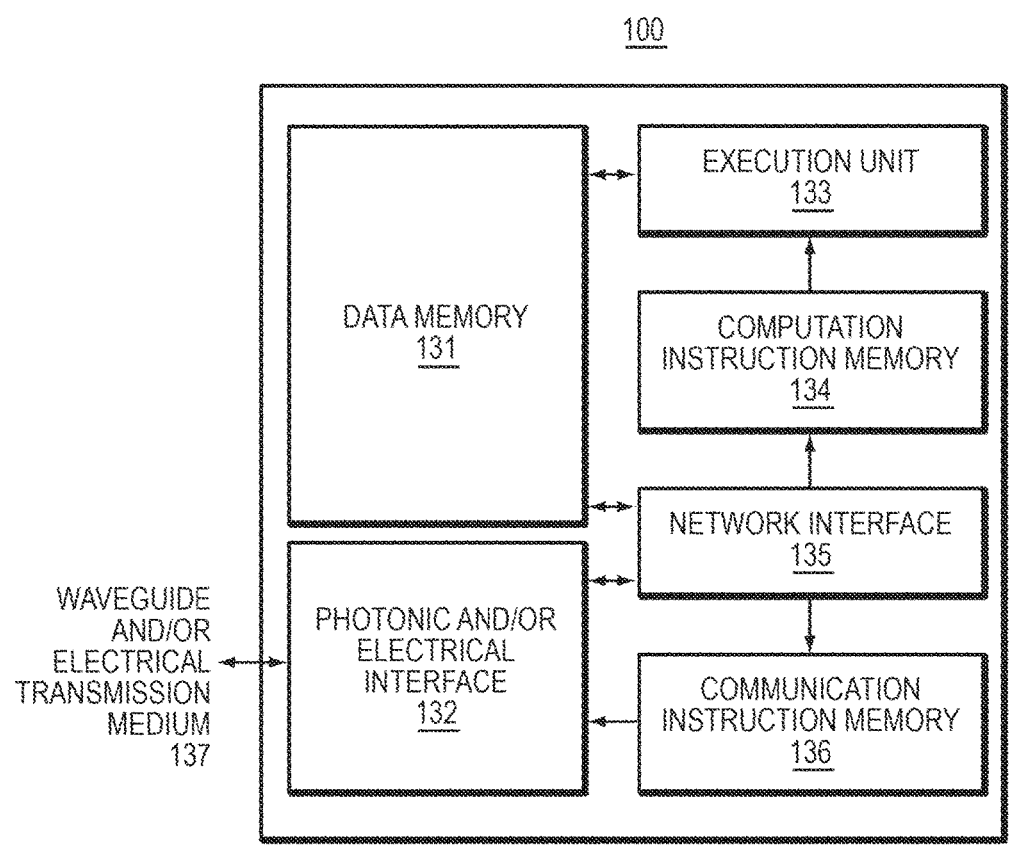
FIG. 5 is a block diagram of a processor architecture of a node and/or processor to which embodiments of the present invention apply.

FIG. 5 represents a node and/or worker processor 100 (which also corresponds to each of the worker processors 100a, 100b, . . . 100n, 100m of FIGS. 2-4). The computation core in the processor 100 includes a local Data Memory 131, an Execution Unit 133, and a Computation Instruction Memory 134. The Execution Unit 133 includes arithmetic and logical units needed to support the instruction set. The Computation Instruction Memory 134 and Data Memory 131 are fed via a Network Interface 135. The Network Interface 135 coordinates distribution of data from a Waveguide (Photonic) Interface and/or Electrical (Electronic) Interface 132 to one or more of various memories 136 in the processing element 100. The Photonic and/or Electrical Interface 132 coordinates inflight data reorganizations from data received from and/or sent to the Waveguide and/or Electrical transmission medium 137 by the node 100 based upon a program stored in the Communication Instruction Memory 136.

Figure 6:
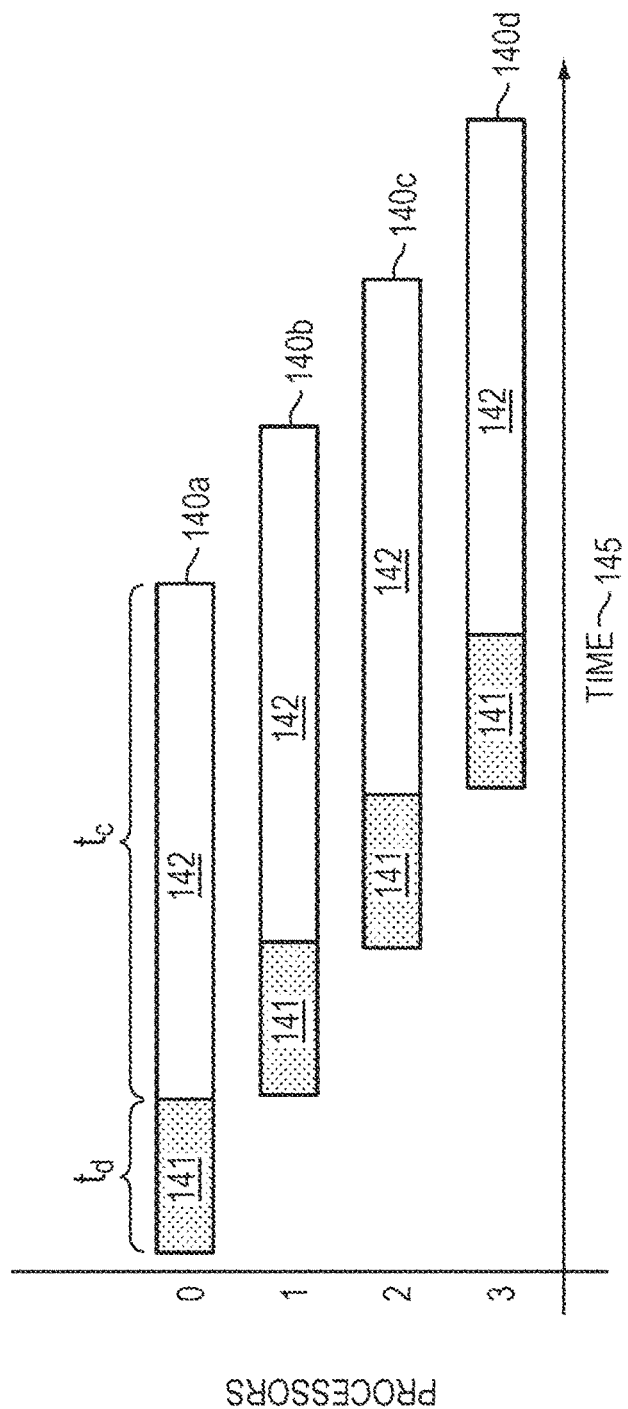
FIG. 6 is a timing diagram of a processor model that utilizes interleaving to which embodiments of the present invention apply.

FIG. 6 is a timing diagram of a processor model that utilizes interleaving to which embodiments of the present invention apply. As illustrated in FIG. 6, one or more of the worker processors may send data to the memory in an interleaved fashion in time 145. FIG. 6 illustrates data flows 140a, 140b, 140c, 140d which may correspond to the data flows of worker processors 100m, 100n, 100b, and 100a of FIGS. 2-4, respectively. As illustrated in FIG. 6, each data flow (each one of 140a, 140b, 140c, 140d) may include $t_d$ (element 141) equal to the time to deliver given data to a single processor, and $t_c$ (element 142) equal to the time to compute on the given data. Also as illustrated in FIG. 6, although the data flows 140a, 140b, 140c, 140d overlap in time, they are staged in such a manner (through the use of the instruction synchronization of the proposed approach) so that the respective times for delivery 141 are non-overlapping with respect to the timeline 145 for data flows 140a, 140b, 140c, 140d, thereby avoiding congestion and conflicts between each of the data flows 140a, 140b, 140c, 140d.

IV. Matrix Distrubution and Maps

Data reorganization may occur because multi-dimensional data structures may be processed along different abstract dimensions. Since computer memory may be a linear resource, addresses may increase sequentially and there is an optimal way to access memory based on its internal structure. If a matrix is mapped to linear memory by sequencing each matrix row in memory address order, sequential operations on matrix elements may be efficient. If, however, a processor needs to operate on columns of the matrix, the row ordered memory mapping may be extremely inefficient.

Figure 7:
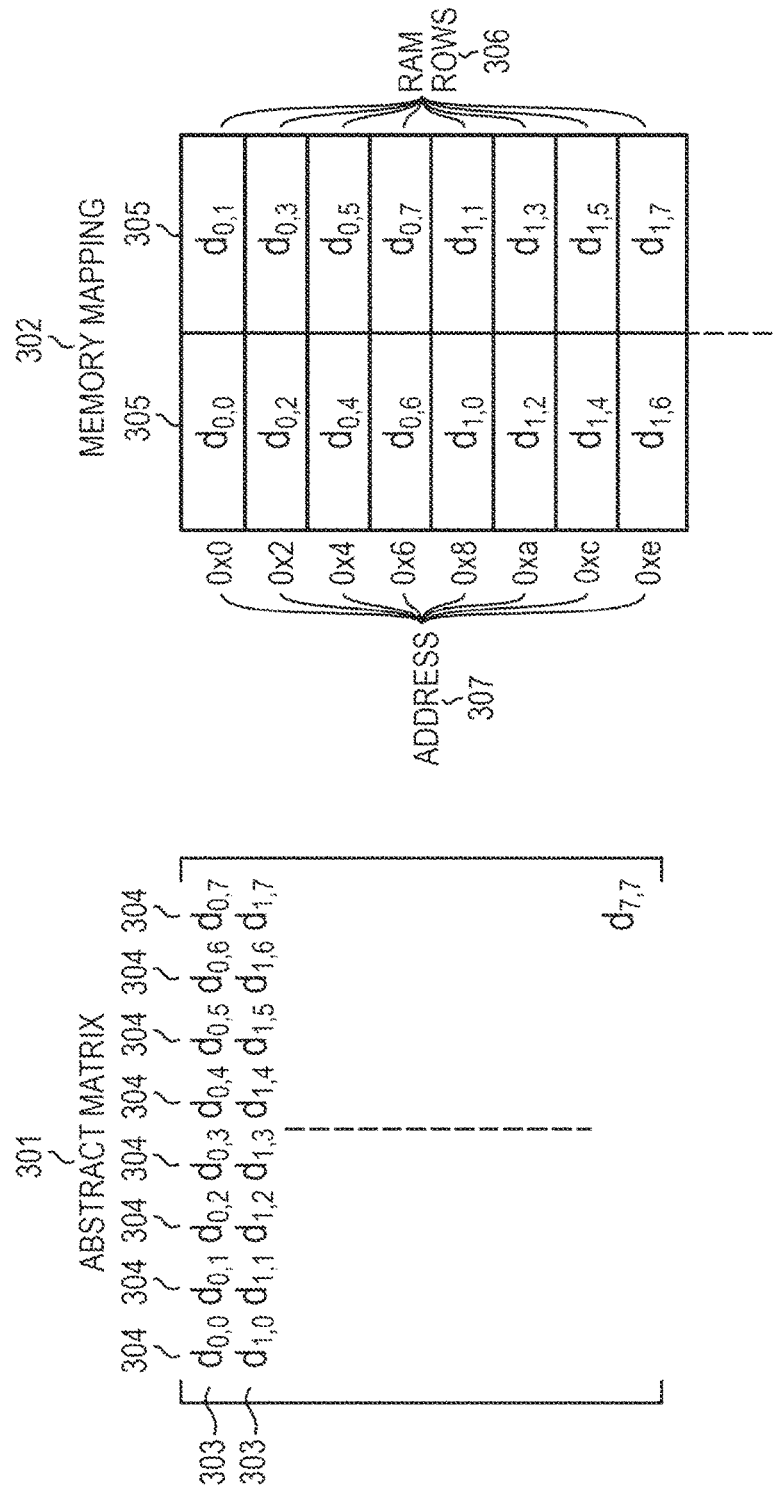
FIG. 7 is a schematic illustration of matrix data being mapped to memory.

Explicit whole structure data reorganizations, such as transpose, are commonly used to pre-stage data in memory in order to increase access efficiency over a set of operations defined by the application. Using the proposed approach, PSCAN may synchronize processors, and the processors may use a global map that may define when each given processor writes to the memory, thereby synthesizing optimally structured memory accesses. FIG. 7 shows an abstract matrix mapped to a memory 302. The memory may include one or more addresses 307 and the memory may be one-dimensional, two-dimensional, three-dimensional, and/or another type of memory. The matrix 301 of FIG. 7 may be stored in row-major order, with each matrix row 303 sequentially stored contiguously in increasing memory row 306 and memory column 305 locations in the memory mapping 302. Because an entire memory row and/or line 306 is preferably read whenever an element on that row and/or line 306 is needed, accessing the matrix in row-order is maximally efficient. If, however, the matrix columns 304 are operated on, a part of each memory row and/or line 306 is needed for a memory mapped column 305. For example, in one embodiment, to get two elements in a matrix column 304 together, two separate memory row and/or line 306 reads occur with half of the retrieved data being used.

V. Isa Extensions for Interconnected Processors

A "map" (and/or global map) may include a pattern with which multiple, spatially separate processors may write data to memory to realize an abstract structure. In some embodiments, a map may specify a contiguous access of memory. In embodiments, the map, which has a distributed view across cooperating processors, specifies the order in which the processors access the shared resource (the transmission medium, such as, but not limited to, a photonic waveguide and/or electrical and/or electronic transmission medium), and therefore the order in which the processors access memory.

If, in an MxN matrix, the number of rows M is equal to the number of processors P operating on the matrix, and each processor may hold N elements of a row, a map for transpose may be defined by the following parameters:

base—The base address of the mapped write;
P—The number of processors (or hardware threads) participating in the synthesized access;
S—The number of bytes written by each processor during its portion of the map; and
B—The number of blocks of size S.

One embodiment of pseudo code that may describe mapping of local non-contiguous data held in processors to a global address space is shown below, where i, j, and k are programming indices:

```
for i in [0 : B – 1]:
    for j in [0 : P – 1]
        for k in [0 : S – 1]:
            processor [j].write (
                local_data[i*S + k],
                base + i*j +k)
```

In one embodiment, in order to illustrate the use of new instructions of the proposed approach in the context of matrix transpose, Applicant adopts NVIDIA's Parallel Thread Execution (PTX) as an Instruction Set Architecture (ISA) foundation. PTX is the intermediate assembly language used by NVIDIA processors. A PTX program is a thread in the data parallel SIMT (single instruction multiple thread) programming model and is agnostic of actual machine resources. Rather, the "thread" knows where it is relative to the data (vector, matrix, and/or three dimensional or 3D space). The run-time environment will parallelize the PTX application according to available resources. PTX allows the expression of parallelism without knowledge of available parallel resources.

Referring back to FIGS. 3-4, a coordinating processor ("head node") 101 and one or more worker processors (100a, 100b, . . . 100n, 100m) may be employed. The proposed approach adds two instructions: a first "global" instruction that runs (and/or executes) on the head node 101; and a second "local" instruction that runs (and/or executes) on the one or more worker processors (100a, 100b, . . . 100n, 100m).

Figure 8:
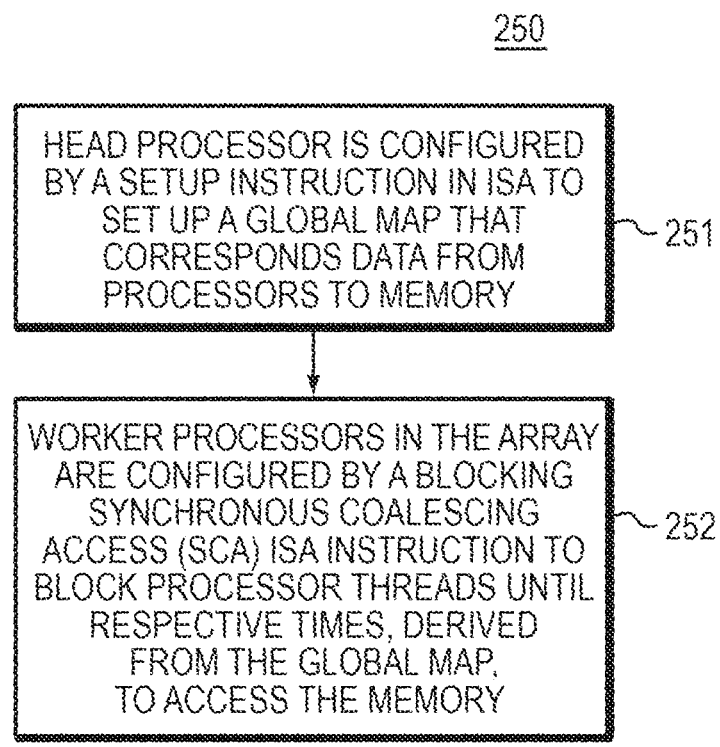
FIG. 8 is a flow chart of a method of an embodiment of the present invention.

FIG. 8 is a flow chart of a method and/or multi-processing system 250 of an embodiment of the present invention. As illustrated in FIG. 8, first the head processor is configured 251 by a setup instruction in ISA to set up a global map that corresponds data from processors to a global memory. Second, the worker processors in the array are configured 252 by a blocking synchronous coalescing access (SCA) ISA instruction to block processor threads until respective times, derived from the global map, to access the unified (and/or global) memory 102 of FIGS. 3-4.

Figure 9:
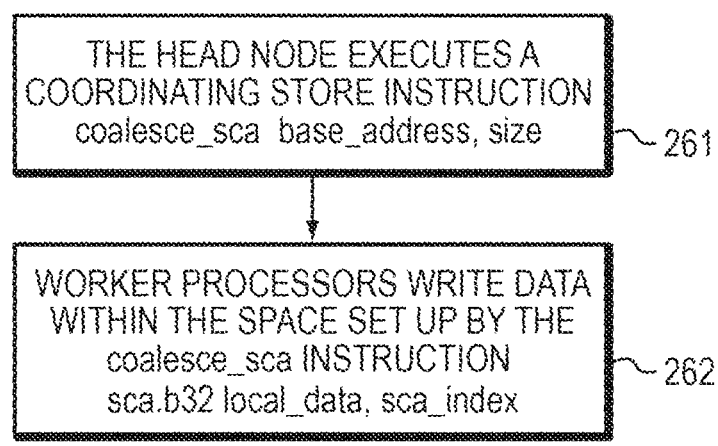
FIG. 9 is a procedural flow chart illustrating a procedure of an embodiment of the present invention.

As illustrated in the procedural flow chart 260 of FIG. 9, the head node may execute a coordinating store instruction 261, such as "coalesce_sca" with parameters of base_address and size. In another embodiment, the head mode may execute 261 setup_sca <base address> <bytes per block> <blocks per processor>. The instruction "setup_sca" may set up a global map of spatially separate data to unified (and/or global) memory.

As illustrated in FIG. 9, the one or more worker processors may write data 262 within the memory space set up by the instruction of the head node. In another embodiment, sca<reg> <size>, the second instruction, "sca," 262 may block a given processor thread until the given processor thread's time in the global map comes around (arrives), at which time the given processor writes <size> bytes to the global memory, through the waveguide of a PSCAN and/or through electrical connectivity means.

In the following non-limiting example, each thread may hold one row of an NxM matrix, such that the number of hardware threads P equals the number of rows M (e.g., P=M). In one embodiment, there is enough local memory to hold one row (i.e., the data thereof). Referring to FIGS. 3-4 and regarding the instructions of the proposed approach, the head node 101 initiates a coalescing read or write, and the worker processors (100a, 100b, . . . 100n, 100m) execute transactions to and/or from memory 102 relative to the control processor's initiation. To start, each worker processor of FIGS. 3-4 (each of 100a, 100b, . . . 100n, 100m, respectively) holds one row 303 of the matrix of FIG. 7 in local memory (which may be located within the given worker processor, and/or a location close in proximity to the given worker processor, but is not so limited) and writes out the transpose.

The following is a non-limiting code example of ISA instructions for the head node processor 101. Note, the instructions may include assembly language commands, such as "mov," "loop," "sub," "add," "bra," illustrated below are known to those skilled in the art, loop count is "r," and row pointer is "rc." Although commands are indicated as 32-bit ("u32"), the commands are not so limited and may apply to other bit-widths, such as, but not limited to, 8-bit, 16-bit, 64-bit, 128-bit, and/or a variable-bit width. In addition, the non-limiting code example below includes an SCA operation used to write a single matrix column back to memory, with N operations to write the entire matrix back to memory in column major form. The "coalesce_sca" instruction may be a blocking instruction that completes after data is received by all of the worker processors (100a, 100b, . . . 100n, 100m). Whereas the "coalesce_sca" instruction sets up a large contiguous block of memory 102, each worker processor writes to a different N byte space within that larger block.

```
mov.u32             r, N
mov.u32             rc, 0
    //set up a loop to go over the entire
    //matrix, one row at a time.
.loop:
    coalesce_sca    base_address, S, B
    //set up the coalescing write for the
    //worker processors to participate in.
    //Parameters may be base address pointer
    //(transposed row destination), B (number
    //of blocks of size S) and S. The
    //base_ address may be computed from the row
    //pointer, rc.
add.32              rc, rc, 1
sub.32              r, r, 1
    //decrement loop count (r) and increment
    //row pointer (rc).
bra loop
    //continue until all rows have been
    //coalesced.
```

In addition, to transfer the data, the worker processors then execute the following code, where "r1," "r2," "r3," "r4," and "r5" are registers and "ld" is a load operation.

```
mov.u32             r1, N           //loop count
mov.u32             r2, [row]       //the size of a row
mov.u32             r3, 0           //loop index
.loop:
    //compute local memory address based on
    //thread id, blocking (if blocked), r2,
    //and put in r5.
ld.local.u32        r4, local [r5];
    //read element out of local memory
sca.b32             r4, r3;
    //participate in the global coalescing
    //store. Each worker thread writes 4
    //bytes of data held in r4 into the
    //global SCA space at position r3. This
    //is a blocking instruction and therefore this instruction waits
    //until this thread's "time" comes up (arrives)
    //on the photonic Time Division Multiplexing (TDM) waveguide
    //before proceeding.
add.u32             r2, r2, 1;
sub.u32             r1, r1, 1;
    //decrement loop count (r1) and
    //increment row pointer (r2)
bra loop;
    //continue until all 32-bit elements have
    //been coalesced.
```

In one embodiment, multiple threads on a given processor may coalesce their row reads from local memory, much the same as the GPU architecture may coalesces row reads from multiple threads within a warp to the GPU global memory. Unlike loads and stores in a CPU or GPU, the SCA instructions allow the hardware to order writes to memory across independent processors. Individually, the processors may write transposed data with no spatial locality, but globally the memory write may be contiguous within the sca_coalesce space. One advantage of the globally synchronous load-store architecture of the proposed approach is that it may change the way programmers think about shared memory programming. What was, in the existing general purpose processor, a collection of independent load-store transactions, is instead presented in the proposed approach as one single memory transaction in which individual processors may order themselves relative to a global schedule. The global schedule of the proposed approach (based on a global clock 103 of FIGS. 3-4) is derivable from the global map, where the global map specifies turn-taking of the processor threads as a relative order among the processors/threads, and where the global schedule is the corresponding set of clock-time based indications of the start times of each processor thread relative to a global clock 103. In one embodiment, the global map may be controlled by the head processor 101 of FIGS. 3-4 and the global map may be illustrated by element 302 in FIG. 7.

Figure 12:
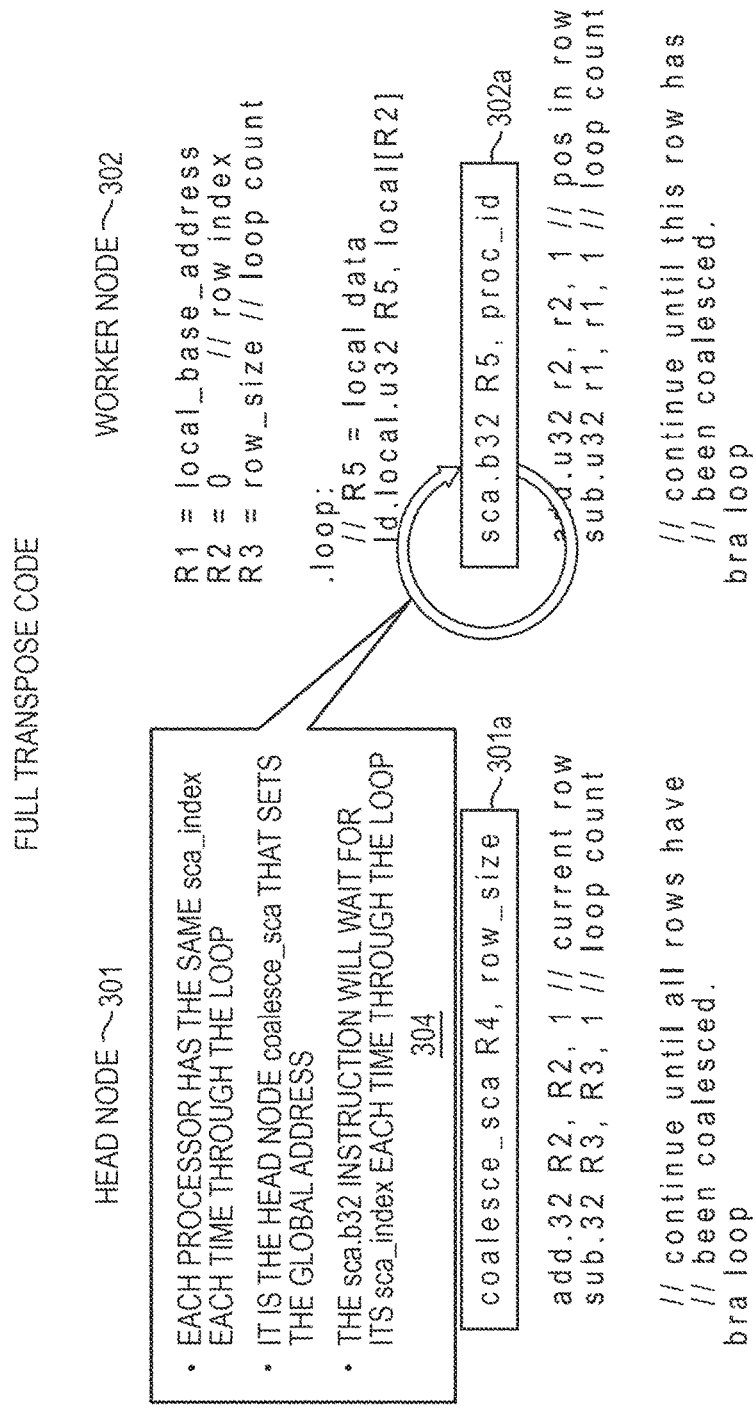
FIG. 12 illustrates the worker node setup instruction of FIG. 10.

In addition, FIGS. 10-12 illustrate additional non-limiting example embodiments of code for a full transpose. FIG. 10 is a procedural code example of an embodiment of the present invention, similar to the code embodiments described above. Code for a head node 301, including a "coalesce_sca" instruction 301a and code for one or more worker nodes 302 including an "sca.b32" instruction 302a is illustrated in FIG. 10.

FIG. 11 illustrates the head node instruction 301a of FIG. 10 in more detail. As illustrated in FIG. 11 element 303, the "coalesce_sca" instruction is executed once for each row of the matrix. Each time through the loop, the "coalesce_sca" instruction waits for the prior coalesce to complete.

FIG. 12 illustrates the worker node instruction 302a of FIG. 10. As illustrated in FIG. 12 element 304, the head node "coalesce_sca" instruction may set the global address. Then, each worker processor (and/or local processor) may have the same "sca_index" as each other worker processor, each time through the loop. The "sca.b32" instruction waits for its given "sca_index" each time through the loop.

VI. Conclusions

Microprocessors have evolved over the last forty plus years from purely sequential single operation machines, to pipelined super-scalar, to threaded and SIMD, and finally to multi-core and massive multi-core and/or multi-thread machines. Despite these advances, in existing approaches, the conceptual model that programmers use to program microprocessors is still that of a single threaded register file bound math unit that is at best loosely synchronized with other such processors. This lack of explicit synchrony in existing approaches, caused by limitations of metal interconnect, limits parallel efficiency. Recent advances in silicon photonic-enabled architectures promise to greatly enable high synchrony over long distances (centimeters or more).

The proposed approach presents two new instructions, a global mapping instruction, called coalesce_sca and a local synchronizing instruction, called sca, that allow programmers to express globally synchronous load-store communication across multiple processors. The globally synchronous load-store architecture of the present invention enables one or more programmers to take a collection of independent load-store processors and combine transactions of the one or more programmers into a single monolithic memory transaction. Therefore, an advantage of the proposed approach is that it presents new programming possibilities for optimizing memory and network traffic, which are not possible with the existing single-threaded view load-store ISAs. Using the present invention, there are more instructions to investigate to further exploit the shared globally synchronous SYNC (including, but not limited to, P-Sync) architecture.

While this invention has been particularly shown and described with references to example embodiments thereof, it will be understood by those skilled in the art that various changes in form and details may be made therein without departing from the scope of the invention encompassed by the appended claims.

What is claimed is:

1. A computer method of multi-processing, comprising:
    for an array of processors coupled to a memory, configuring a head processor to set up a global map that corresponds data from certain ones of the processors contiguously to the memory, the head processor and the certain ones of the processors being in the array of processors; and
    configuring the certain ones of the processors to block processor threads until respective times, derived from the global map, to access the memory;
    wherein the array of processors, and the memory are part of a photonically-enabled synchronous coalesced access network (PSCAN); and one or more of the processors of the array of processors access the memory through at least one shared photonic waveguide of the PSCAN; and
    the one or more of the processors of the array of processors performing one or more inflight data reorganizations based upon the at least one shared photonic waveguide accessed through the memory.

2. A method as claimed in claim 1 at least one of the processors performs at least one of: retrieving at least a portion of the data from the memory and sending at least a portion of the data to the memory.

3. A method as claimed in claim 1 wherein the configuring of the head processor is by a setup instruction in an ISA (Instruction Set Architecture), and
    a) wherein the configuring of the certain processors is by a blocking synchronous coalescing access (SCA) ISA instruction.

4. A method as claimed in claim 3 wherein the setup instruction and the SCA ISA instruction are user selectable and user settable.

5. A method as claimed in claim 3 wherein the setup instruction is executed at the head processor and the SCA ISA instruction is provided by the head processor to the certain ones of the processors.

6. A method as claimed in claim 1 wherein at least one of the processors accesses the memory in an interleaved fashion with respect to at least another of the processors.

7. A method as claimed in claim 1 wherein portions of the memory are located at geographically separate locations, and each given processor of the array is associated with the memory and the portions of the memory.

8. A method as claimed in claim 1 wherein the head processor is one of the processors in the array.

9. A method as claimed in claim 1 wherein the array of processors and memory include at least one of:
    an electrically-enabled synchronous coalesced access network, wherein one or more of the processors of the array of processors access the memory through electrical connectivity; and
    a hybrid PSCAN (PSCAN), wherein one or more of the processors of the array of processors access the memory through a combination of the single shared photonic waveguide and electrical connectivity.

10. A non-transitory computer readable medium having stored thereon a sequence of instructions which, when loaded and executed by a processor coupled to an apparatus causes the apparatus to:

for an array of processors coupled to a memory, configure a head processor to set up a global map that corresponds data from certain ones of the processors contiguously to the memory, the head processor and the certain ones of the processors being in the array of processors; and configure the certain ones of the processors to block processor threads until respective times, derived from the global map, to access the memory;

wherein the array of processors and the memory are part of a photonically-enabled synchronous coalesced access network (PSCAN); and at least one of the processors of the array access the memory through at least one shared photonic waveguide of the PSCAN; and the one or more of the processors of the array of processors perform one or more inflight data reorganizations based upon the at least one shared photonic waveguide accessed through the memory.

11. A multi-processing computer system comprising:

an array of processors including:

a head processor; and other processors; and a memory with computer code instructions stored thereon, the memory operatively coupled to the array of processors such that, when executed by the array of processors, the computer code instructions cause the system to:

configure the head processor, by a setup instruction in an ISA (Instruction Set Architecture), to set up a global map that corresponds data from certain ones of the other processors in the array of processors contiguously to the memory; and configure the certain ones of the processors in the array by a blocking synchronous coalescing access (SCA) ISA instruction to block processor threads until respective times, derived from the global map, to access the memory;

wherein the array of processors and the memory are part of a photonically-enabled synchronous coalesced access network (PSCAN); and one or more of the processors in the array of processors access the memory through at least one shared photonic waveguide of the PSCAN; and the one or more of the processors of the array of processors perform one or more inflight data reorganizations based upon the at least one shared photonic waveguide accessed through the memory.

12. The multi-processing computer system as claimed in claim 11 wherein at least one of the processors performs at least one of: retrieving at least a portion of the data from the memory and sending at least a portion of the data to the memory.

13. The multi-processing computer system as claimed in claim 11 wherein the setup instruction and the SCA ISA instruction are user selectable and user settable.

14. The multi-processing computer system as claimed in claim 11 wherein at least one of the processors accesses the memory in an interleaved fashion with respect to at least another of the processors.

15. The multi-processing computer system as claimed in claim 11 wherein the head processor is one of the processors in the array.

16. The multi-processing computer system as claimed in claim 11 wherein the setup instruction is executed at the head processor and the SCA ISA instruction is provided by the head processor to the certain ones of the processors.

17. The multi-processing computer system as claimed in claim 11 wherein portions of the memory are located at geographically separate locations, and each given processor of the array is associated with the memory and the portions of the memory.

18. The multi-processing computer system as claimed in claim 11 wherein the array of processors uses at least one of wavelength division multiplexing (WDM) and time division multiplexing (TDM) to access the memory.

19. The multi-processing computer system as claimed in claim 11 wherein the array of processors and memory include at least one of:

an electrically-enabled synchronous coalesced access network, wherein one or more of the processors of the array of processors access the memory through electrical connectivity; and a hybrid PSCAN (PSCAN), wherein one or more of the processors of the array of processors access the memory through a combination of the single shared photonic waveguide and electrical connectivity.

20. The multi-processing computer system as claimed in claim 11 wherein the one or more of the processors of array of processors uses time division multiplexing (TDM) to access the memory.

21. The multi-processing computer system as claimed in claim 11 wherein the one or more of the processors of the array of processors perform one or more inflight data reorganizations based upon the at least one shared photonic waveguide accessed through the memory.

22. The multi-processing computer system as claimed in claim 21 wherein the one or more inflight data reorganizations include a matrix transpose of at least a portion of data stored in the memory.

23. The multi-processing computer system as claimed in claim 11 wherein the SCA ISA instruction is performed on a plurality of the processors simultaneously.

24. The multi-processing computer system as claimed in claim 11 wherein the one or more inflight data reorganizations include a matrix transpose of at least a portion of data stored in the memory.

* * * * *